United States Patent
Becker et al.

(10) Patent No.: US 7,991,388 B1
(45) Date of Patent: Aug. 2, 2011

(54) GEO-BIO-METRIC PIN

(75) Inventors: Dennis Becker, Cardiff, CA (US); Alex Shah, San Diego, CA (US)

(73) Assignee: CommerceTel, Inc., San Diego, CA (US)

( * ) Notice: Subject to any disclaimer, the term of this patent is extended or adjusted under 35 U.S.C. 154(b) by 0 days.

(21) Appl. No.: 13/104,061

(22) Filed: May 10, 2011

(51) Int. Cl.
*H04M 3/16* (2006.01)
*H04W 24/00* (2009.01)

(52) U.S. Cl. ............... 455/411; 455/456.1; 455/410

(58) Field of Classification Search .............. None
See application file for complete search history.

(56) References Cited

U.S. PATENT DOCUMENTS

| | | | |
|---|---|---|---|
| 2006/0095790 A1* | 5/2006 | Nguyen et al. | 713/186 |
| 2008/0102956 A1 | 5/2008 | Burman et al. | |
| 2009/0152343 A1 | 6/2009 | Carter et al. | |
| 2009/0176565 A1 | 7/2009 | Kelly | |
| 2011/0053559 A1 | 3/2011 | Klein | |

FOREIGN PATENT DOCUMENTS

| | | |
|---|---|---|
| EP | 1486913 | 12/2004 |
| EP | 1662438 | 5/2006 |

* cited by examiner

*Primary Examiner* — Erika Gary
(74) *Attorney, Agent, or Firm* — Clause Eight IPS; Michael Catania (57) ABSTRACT

A method and system for authenticating an account holder is disclosed herein. The method and system allows for real-time authentication with multiple procedures to prevent fraud and spoofing of the authentication process. The method and system involves the user photographing himself or herself for facial recognition verification, determination of location by cell phone tower verification, and a PIN preferably sent by SMS text message directly the account holder's mobile phone. The method and system may be used for verifying that a gambler is within a gambling jurisdiction.

3 Claims, 11 Drawing Sheets

GEO-BIO-METRIC PIN

CROSS REFERENCE TO RELATED APPLICATION

Not Applicable

STATEMENT REGARDING FEDERALLY SPONSORED RESEARCH OR DEVELOPMENT

Not Applicable

BACKGROUND OF THE INVENTION

1. Field of the Invention

The present invention generally relates to telecommunications. More specifically, the present invention relates to telecommunications used for authentication.

2. Description of the Related Art

The prior art discusses verifies method for authentication of a transaction using a mobile phone to confirm that the person conducting the transaction is a legitimate account holder.

The prior art discusses various techniques for betting. However, only recently has the Nevada Gaming Authority allowed some betting to be placed over a mobile telephone. The mobile telephone betting is currently limited to BLACKBERRY smartphones which can have a plurality of functions deactivated during the bet. Further, the location of the BLACKBERRY smartphone can be verified once all of the periphery functions are deactivated. Thus, when a gambler is placing a bet using his or her BLACKBERRY smartphone to communicate with a gambling facility, the Nevada Gambling Authority can verify that the gambler is located within Nevada.

Your face has certain distinguishable landmarks. These are the peaks and valleys that make up the different facial features. Facial recognition software defines these landmarks as nodal points. There are about 80 nodal points on a human face. A few of the nodal points that are measured by the facial recognition software: distance between eyes; width of nose; depth of eye sockets; cheekbones; Jaw line; and chin. These nodal points are measured to create a numerical code that represents the face in a database. This code is referred to as a faceprint and only fourteen to twenty-two nodal points are necessary for the software to complete the recognition process.

However, there is no solution to allowing other mobile phones to be used to place bets since the Nevada Gambling Authority cannot verify that the gambler is located within Nevada.

BRIEF SUMMARY OF THE INVENTION

The present invention provides a solution that would allow most other mobile telephones to be used to place bets and allow the Nevada Gambling Authority to verify that the gambler is located within Nevada. Such preferred telephonic computing devices include the IPHONE® smartphone from Apple, Inc., BLACKBERRY® smartphones from Research In Motion, the ANDROID® smartphone from Google, Inc., the TRE® smartphone from Palm, Inc., and many more.

One aspect of the present invention is a method for authentication using a mobile phone. The method includes receiving a communication from a mobile phone, with the mobile phone having a camera. The method also includes receiving an image of an account holder from the camera of the mobile phone. The method also includes analyzing the image of the account holder using a facial recognition program. The method also includes confirming that the image of the account holder is a new image of the account holder. The method also includes verifying that the mobile phone is geographically located in a specific jurisdiction. The method also includes receiving an account action from the account holder. The method also includes transacting the account action for the account holder.

The account holder preferably is a gambler, the specific jurisdiction is a gambling jurisdiction and the account action is a bet.

Another aspect of the present invention is a method for authentication using a mobile phone. The method includes receiving a communication from a mobile phone, with the mobile phone having a camera. The method also includes receiving an image of an account holder from the camera of the mobile phone. The method also includes analyzing the image of the account holder using a facial recognition program. The method also includes confirming that the image of the account holder is a new image of the account holder. The method also includes receiving a confirmation that an accelerometer of the mobile phone has been activated during the communication. The method also includes verifying that the mobile phone is geographically located in a specific jurisdiction. The method also includes receiving an account action from the account holder. The method also includes transacting the account action for the account holder.

Yet another aspect of the present invention is a method for gambling using a mobile phone. The method includes receiving a communication from a gambler to a gambling website from a mobile phone, with the mobile phone having a camera. The method also includes confirming that the gambler has established an account with a gambling site and the name, age and mobile phone number for the gambler has been verified. The method includes transmitting a PIN via SMS text message to the mobile phone over a wireless phone network. The method also includes receiving a real-time image of a gambler from the camera of the mobile phone. The method also includes analyzing the image of the account holder using a facial recognition program. The method also includes confirming that the image of the account holder is a new image of the account holder. The method also includes receiving a confirmation that an accelerometer of the mobile phone has been activated during the communication. The method also includes verifying that the mobile phone is geographically located in a specific jurisdiction. The method also includes receiving an account action from the account holder. The method also includes transacting the account action for the account holder.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

The Geo-Bio-Metric Pin service preferably authenticates a user from a feature phone or smart phone using a number of mobile attainable attributes: geolocation, facial image, an accelerometer, and text messaging. The end goal of the Geo-Bio-Metric Pin service is to authenticate a user while verifying the following: 1) the user is currently using his/her phone; 2) the user is at the geolocation that their phone is at; 3) the user is not at another location and using their phone through a proxy; and 4) an impostor is not using the phone.

When the end-user submits his credentials: 1) facial image; 2) PIN (personal identification number); and 3) geolocation, he does so by preferably shaking the phone. Shaking the phone reads the accelerometer hardware available on smart phones and limits the ability to submit a photo from a phone that is not physically in the end-user's hand.

Geolocation can be obtained in a variety of ways: 1) closest cell phone tower; 2) triangulation via 2 or more cell phone towers; and 3) on-device GPS. The present invention leverages any of these methodologies to obtain location, depending on accuracy required for authentication and device capabilities.

Figures 1, 2:
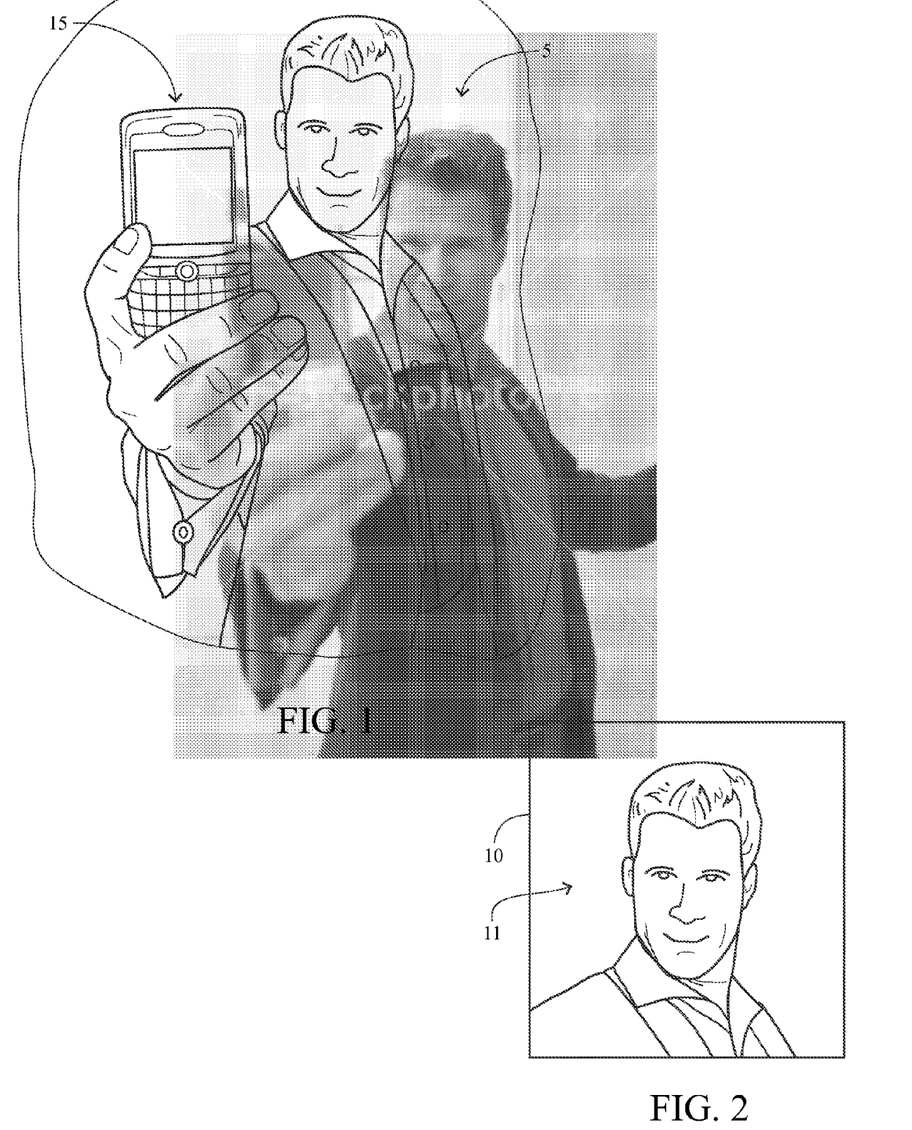
FIG. 1 is an image of a user photographing himself with a camera function of a mobile phone for an authentication process of the present invention.
FIG. 2 is a facial image of a user photographed from a mobile phone for an authentication process of the present invention.

As shown in FIG. 1, an authentication process involves a user 5 photographing himself or herself with a camera function of a mobile phone 15. The user 5 needs to submit a current image 10 of a facial portion 11 of the user 5 as shown in FIG. 2.

Figure 3:
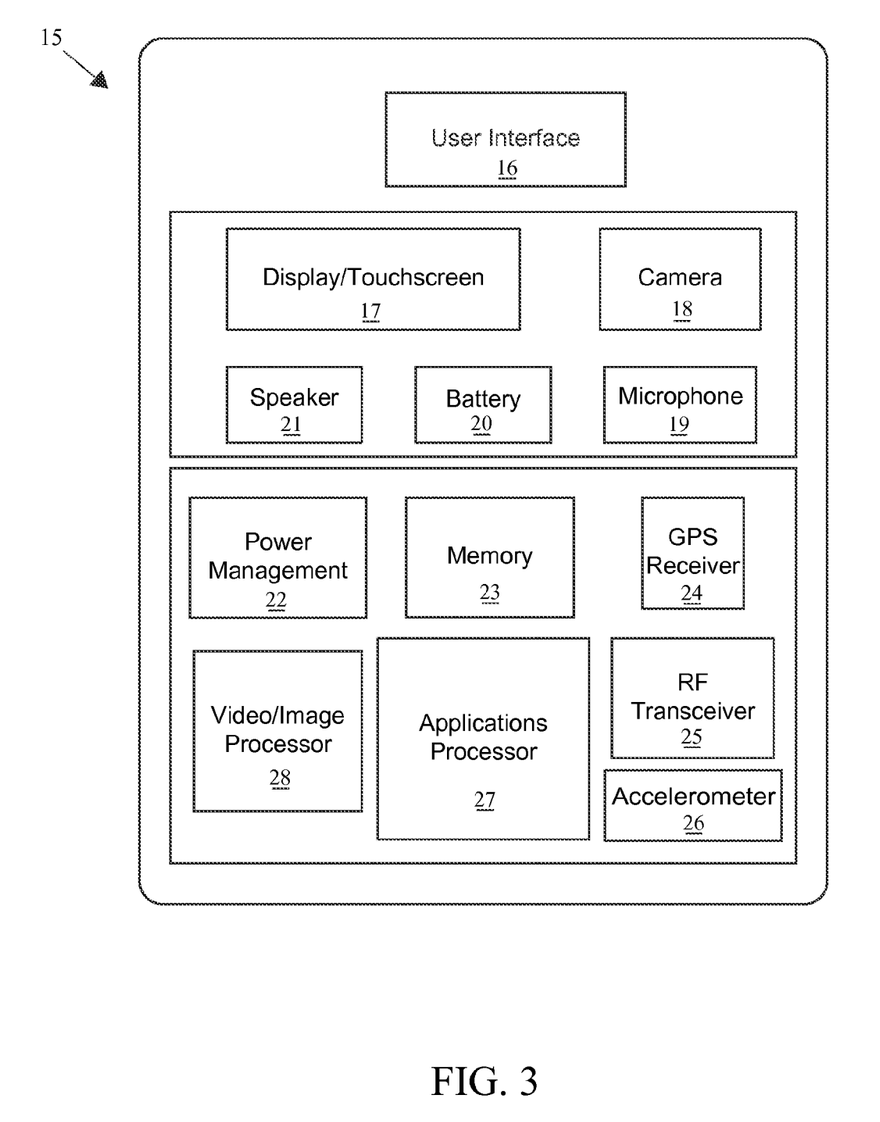
FIG. 3 is a block diagram of a mobile phone.

As shown in FIG. 3, a preferred mobile phone 15 comprises a user interface 16, a display/touchscreen 17, a camera function 18, a microphone 19, a battery 20, a speaker 21, a power management module 22, a memory 23, a GPS receiver 24, a radiofrequency transceiver 25, an accelerometer 26, an applications processor 27 and a video/image processor 28.

Figure 4:
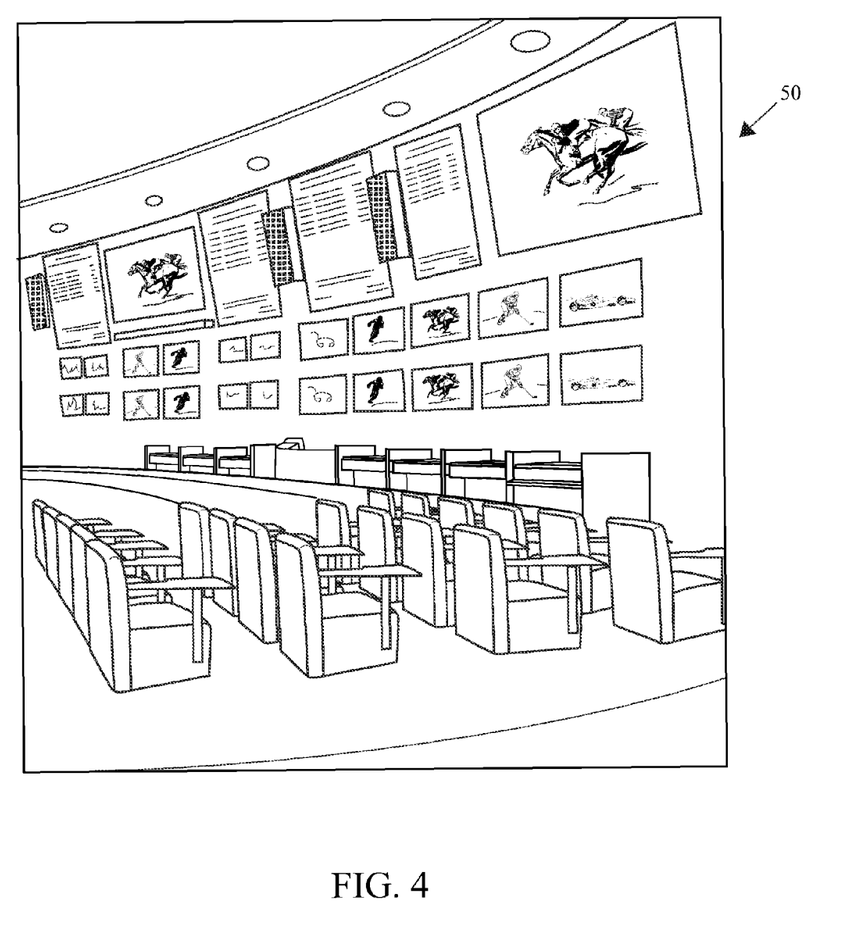
FIG. 4 is an illustration of a sports book.

The authentication process can be used to place a bet from a remote location within a gambling jurisdiction to a sports book 50 such as shown in FIG. 4.

Figure 5:
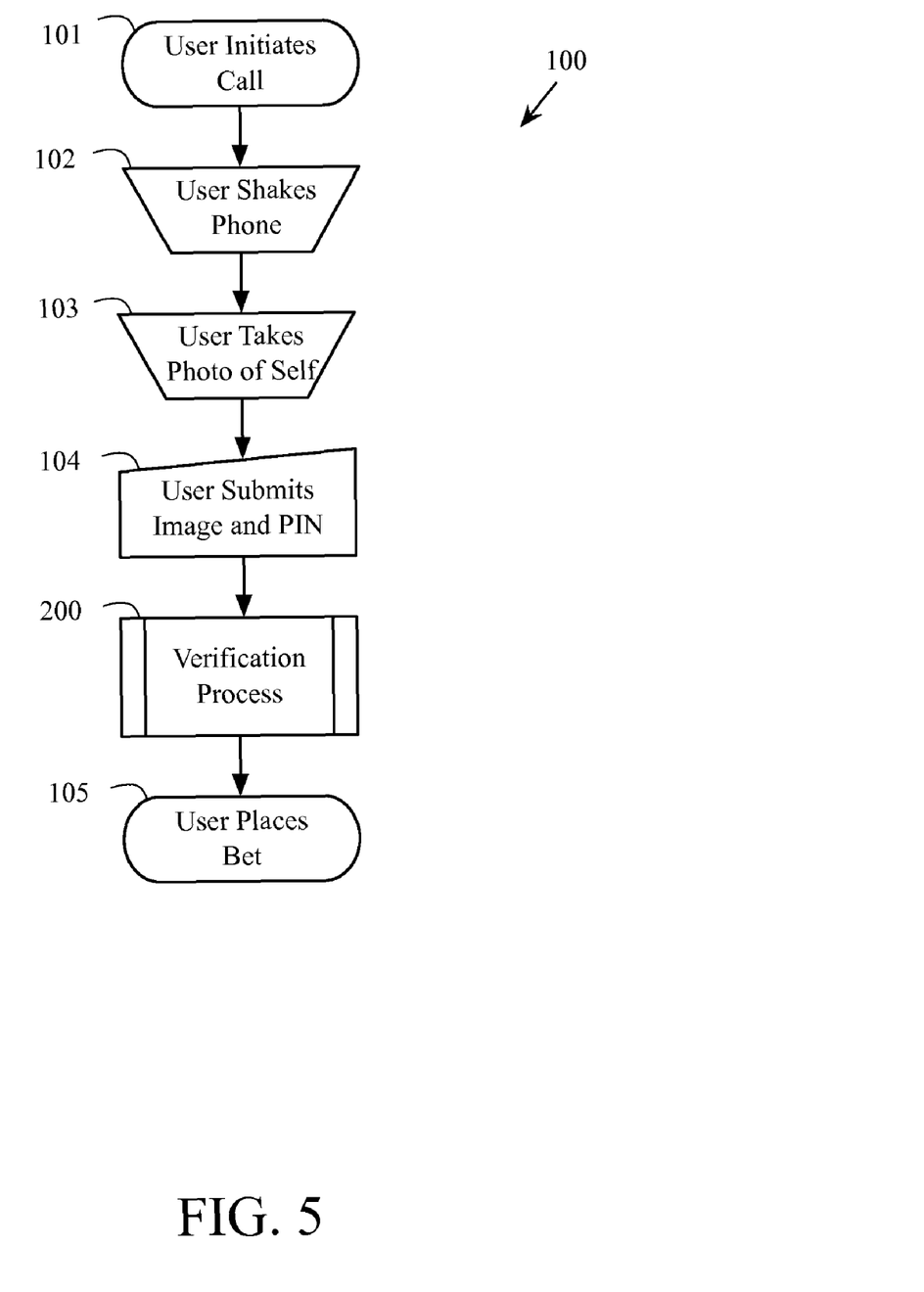
FIG. 5 is a flow chart of an authentication process of the present invention.

One preferred authentication process 100 of the present invention is shown in FIG. 5. At block 101, a user initiates a call from a mobile phone. At block 102, the user shakes the mobile phone. At block 103, the user takes a photo of a facial image himself or herself. At block 104, the user submits the facial image and PIN to an authentication server using the mobile phone. The facial image, preferably a compressed digital facial image such as a JPEG image, is sent to a wireless carrier as a MMS, a SMS, a SMTP, or WAP upload. At block 200 a verification process occurs. At block 105, the user has been verified and can place a bet for gambling or conduct a transaction.

Figure 5A:
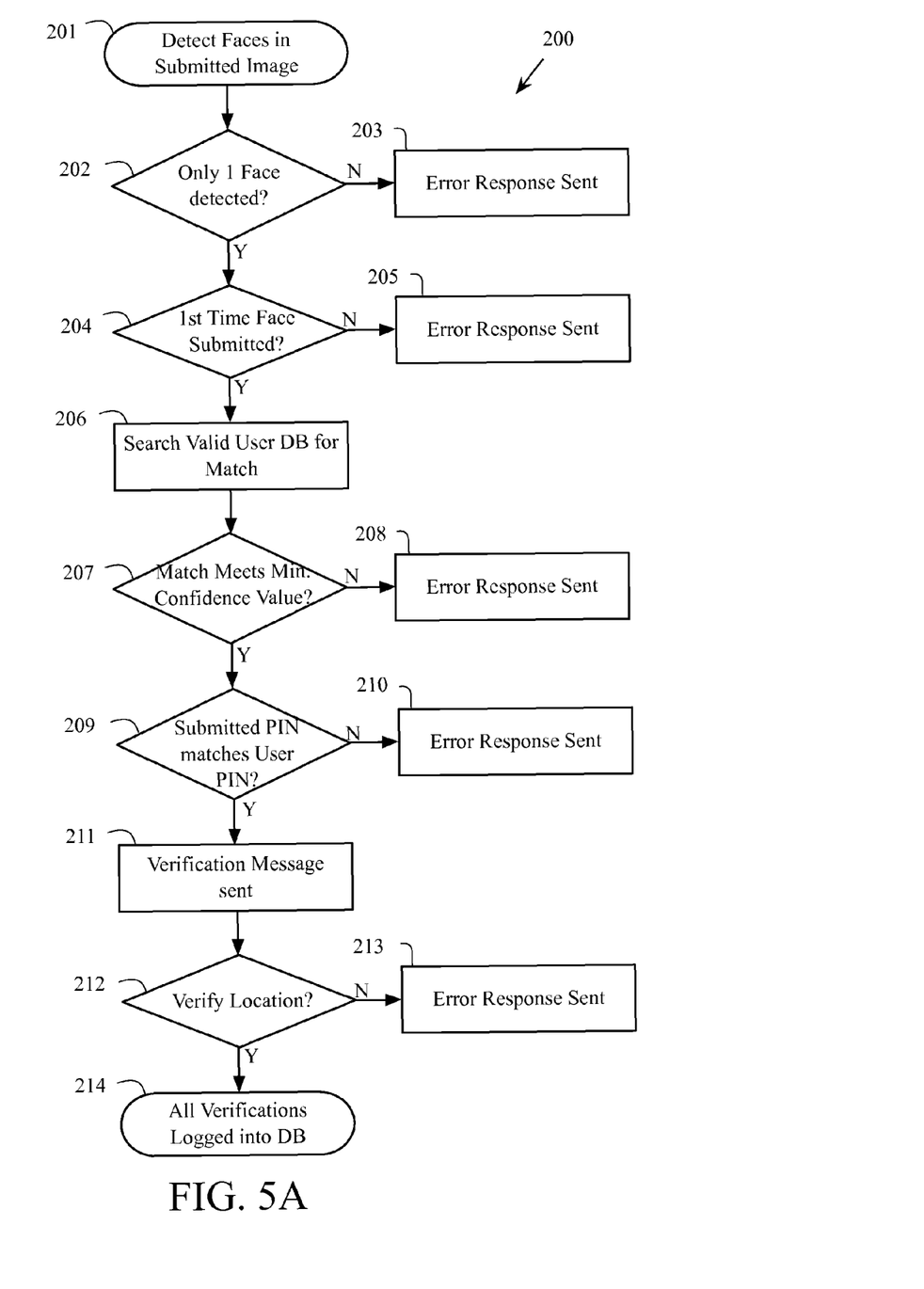
FIG. 5A is a flow chart of a verification step of an authentication process of the present invention.

A flow chart for the verification step 200 is shown in FIG. 5A. At block 201, the facial recognition program analyzes the facial image submitted by the user to confirm that only one face is detected in the image. present invention preferably uses facial recognition software commercially or publicly available such as the FACEIT brand software from IDENTIX, the FACEVACS brand software from COGNETIC, and others. Those skilled in the pertinent art will recognize that there are many facial recognition softwares, including those in the public domain, that may be used without departing from the scope and spirit of the present invention.

At decision 202 block if more than one face is detected in the image an error message is sent to the user at block 203. If only one face is detected in the image, then at decision block 204 the image is analyzed to confirm that this image has not been sent before for authentication since the authentication process must confirm that the user is the one performing the transaction and a real-time image is part of the confirmation. processing of image preferably comprises using an algorithm which includes a principle component analysis technique to process the face of the facial image into an average of a multitude of faces, otherwise known as the principle component and a set of images that are the variance from the average face image known as the additional components. Each is reconstructed by multiplying the principal components and the additional components against a feature vector and adding the resulting images together. The resulting image reconstructs the original face of the facial image. Processing of the facial image comprises factors such as facial hair, hair style, facial expression, the presence of accessories such as sunglasses, hair color, eye color, and the like. Essentially a primary feature vector is created for the facial image. If the facial recognition software determines that this image was previously sent, an error message is sent to the user at block 205.

At block 206, a valid user database searched to determine if there is a match with a primary vector of the database. If a match does not meet a minimum confidence value than at block 208 an error message is sent to the user. If a match does meet a minimum confidence value, then at block 209 the authentication server determines if a PIN submitted by the user matches the users PIN. If the PIN does not match, then an error message is sent to the user at block 210. If the PIN does match, then a verification message is sent to the user. At block 212, the authentication server verifies the physical location of the user. If the physical location is not verified, then at block 213 an error message is sent to the user. If the physical location of the user is verified, then at block 214 all verifications are logged into the database for authentication of the transaction.

Figure 6:
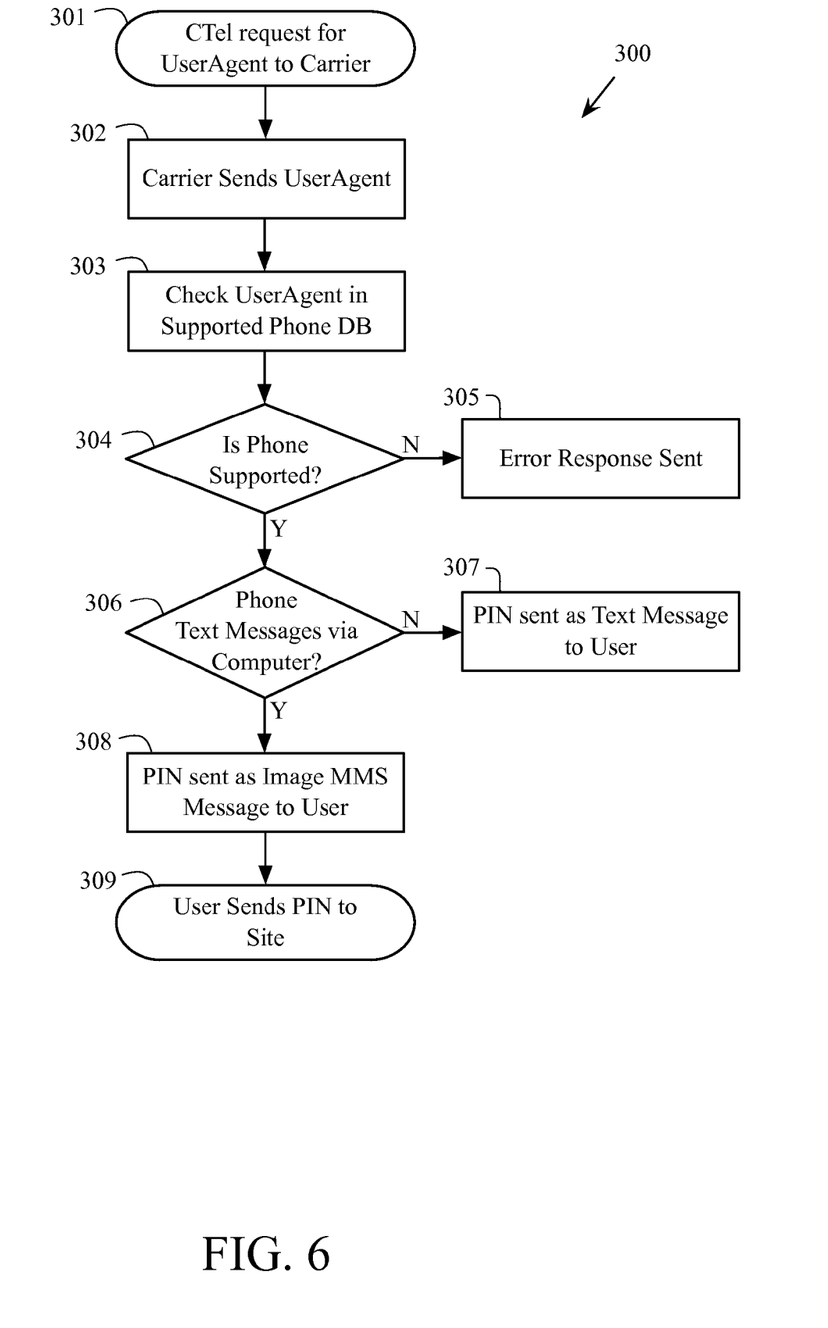
FIG. 6 is a flow chart of a verification step of an authentication process of the present invention.

FIG. 6 is a flow chart of a PIN transmittal sub-process 300 of the authentication process. At block 301, the authentication server sends a request for a useragent to a phone carrier of the user such as VERIZON, AT&T, SPRINT, T-MOBILE, and the like phone carriers in order to determine what type of phone is used by the user. At block 302, the carrier sends the useragent (the type of phone) to the authentication server. At block 303, the authentication server checks in a supported phone database to determine if the phone is supported by the authentication software application. At decision block 304, if the phone is not supported, at block 305 an error message is sent to the user. If the phone is supported, at decision block 306, the authentication server inquires if the phone text messages via computer. If the phone does not, then a PIN is sent as a text message to the user at block 307. If the phone does text messages via computer, then a PIN is sent as an image MMS message to the user at block 308. At block 309, the user sends the PIN to the site of the transaction.

Figure 7:
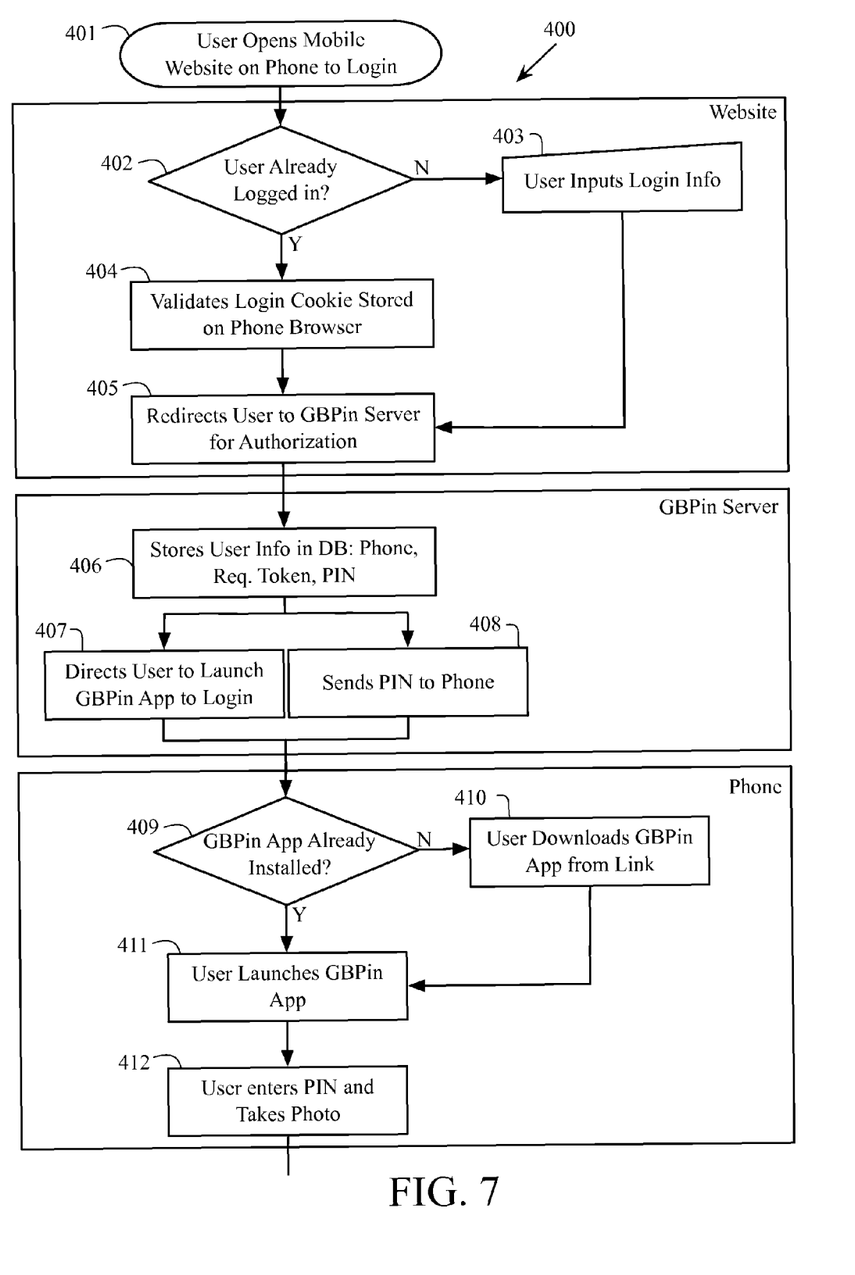
FIG. 7 is a flow chart of an authentication process of the present invention.

FIG. 7 is a flow chart of an authentication process 400 of the present invention. At block 401, a user opens a mobile application on the user's mobile phone to perform a transaction with a third-party provider such as a bank, investment firm, utility service provider, gambling establishment and the like. On the third-party provider's website, at decision block 402, an inquiry is made to determine if the user is logged into his account. If the user is not logged into the user's account, then at block 403 the user inputs the user's information. If the user is logged into the user's account, then at block 404 the login is validated by a login cookie stored on a mobile phone browser on the user's mobile phone. At block 405, the user is redirected to an authentication server for authorization/authentication of the transaction.

At block 406 at the authentication server, the user's information is stores in a database. The user's information comprises the phone number, request token, and PIN. At block 407, the authentication server directs the user to launch the authentication software application to login. At block 408, the authentication server sends a PIN to the mobile phone.

On the user's mobile phone, at decision block 409, an inquiry is made to determine if the authentication software application is already installed on the user's mobile phone. If the authentication software application is not installed, then at block 410 the user downloads the authentication software application from a link provided on the webpage of the third party's website shown on the user's mobile phone by the user's browser. At block 411, the use launches the authentication software application. At block 412, the user enters the user's PIN and photographs a real-time facial image of himself or herself. At block 413, a location software authenticates the user's location, and the user's phone, PIN and token are also authenticated. At block 414, the user is logged into the authentication server and an access token is issued for the transaction. At block 415, the mobile website validates the access token. At block 416, the user conducts the transaction on the mobile website which could be placing a bet, transferring money, investing in a stock, paying a bill, and the like.

Figure 8:
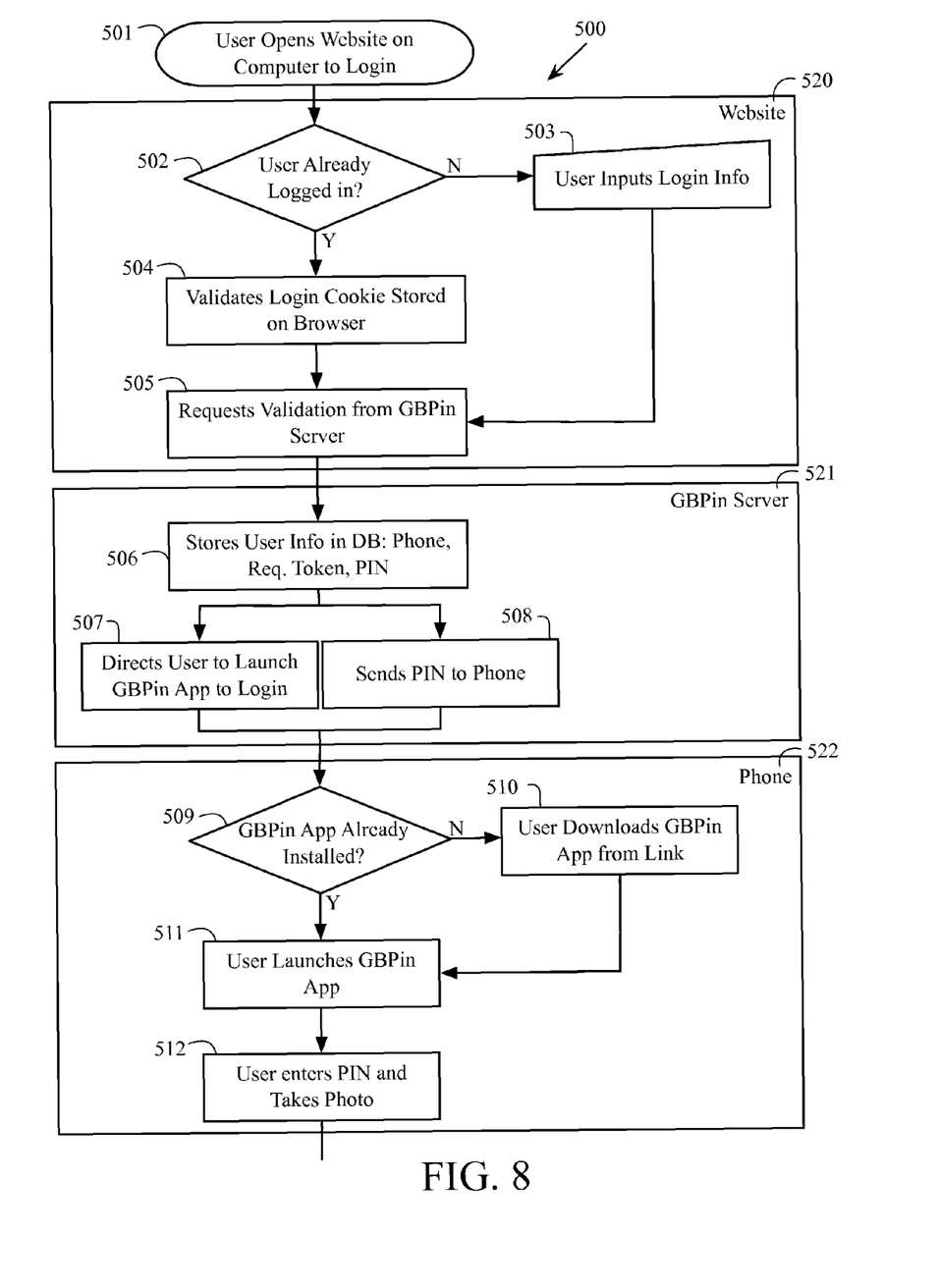
FIG. 8 is a flow chart of an authentication process of the present invention.

FIG. 8 is a flow chart of an authentication process 500 of the present invention. At block 501, a user opens an application on the user's mobile phone, tablet (such as an IPAD™ from Apple Inc.), computer or other graphical user interface device to perform a transaction with a third-party provider such as a bank, investment firm, utility service provider, gambling establishment and the like. On the third-party provider's website 520, at decision block 502, an inquiry is made to determine if the user is logged into his account. If the user is not logged into the user's account, then at block 503 the user inputs the user's information. If the user is logged into the user's account, then at block 504 the login is validated by a login cookie stored on a mobile phone browser on the user's mobile phone. At block 505, the user is redirected to an authentication server for authorization/authentication of the transaction.

At block 506 at the authentication server 521, the user's information is stores in a database. The user's information comprises the phone number, request token, and PIN. At block 507, the authentication server directs the user to launch the authentication software application to login. At block 508, the authentication server sends a PIN to the mobile phone.

On the user's mobile phone 522, at decision block 509, an inquiry is made to determine if the authentication software application is already installed on the user's mobile phone. If the authentication software application is not installed, then at block 510 the user downloads the authentication software application from a link provided on the webpage of the third party's website shown on the user's mobile phone by the user's browser. At block 511, the use launches the authentication software application. At block 512, the user enters the user's PIN and photographs a real-time facial image of himself or herself.

At block 513 on the authentication server 521, the authentication server verifies the user using facial recognition software, verifies the user's phone's GPS, verifies the user's PIN and the token is authenticated. At decision block 514 an inquiry is made to determine if the third-party provider website requires additional verification. If no further verification is necessary, than at block 517 the user logs into the authentication server and an access toke is issued. If further verification is necessary then at block 515, a request for authentication of the mobile phone is sent to a location software/service. One preferred mobile phone location software/service is provided by WAVEMARKET. At block 516, the location software authenticates the user's location via a mobile phone network provider such as VERIZON, AT&T, SPRINT, T-MOBILE, CRICKET and the like. In such a location authentication process, the authentication server sends a request to the location software/service server which sends a request to the carrier which goes over the carrier phone network to a cell phone tower for verification. At block 517 the user logs into the authentication server and an access toke is issued.

At block 518 on the third-party provider website 520, the website validates the access token provided by the authentication server. At block 519, the user logs into the website and the user conducts the transaction on the website which could be placing a bet, transferring money, investing in a stock, paying a bill, and the like.

Figure 9:
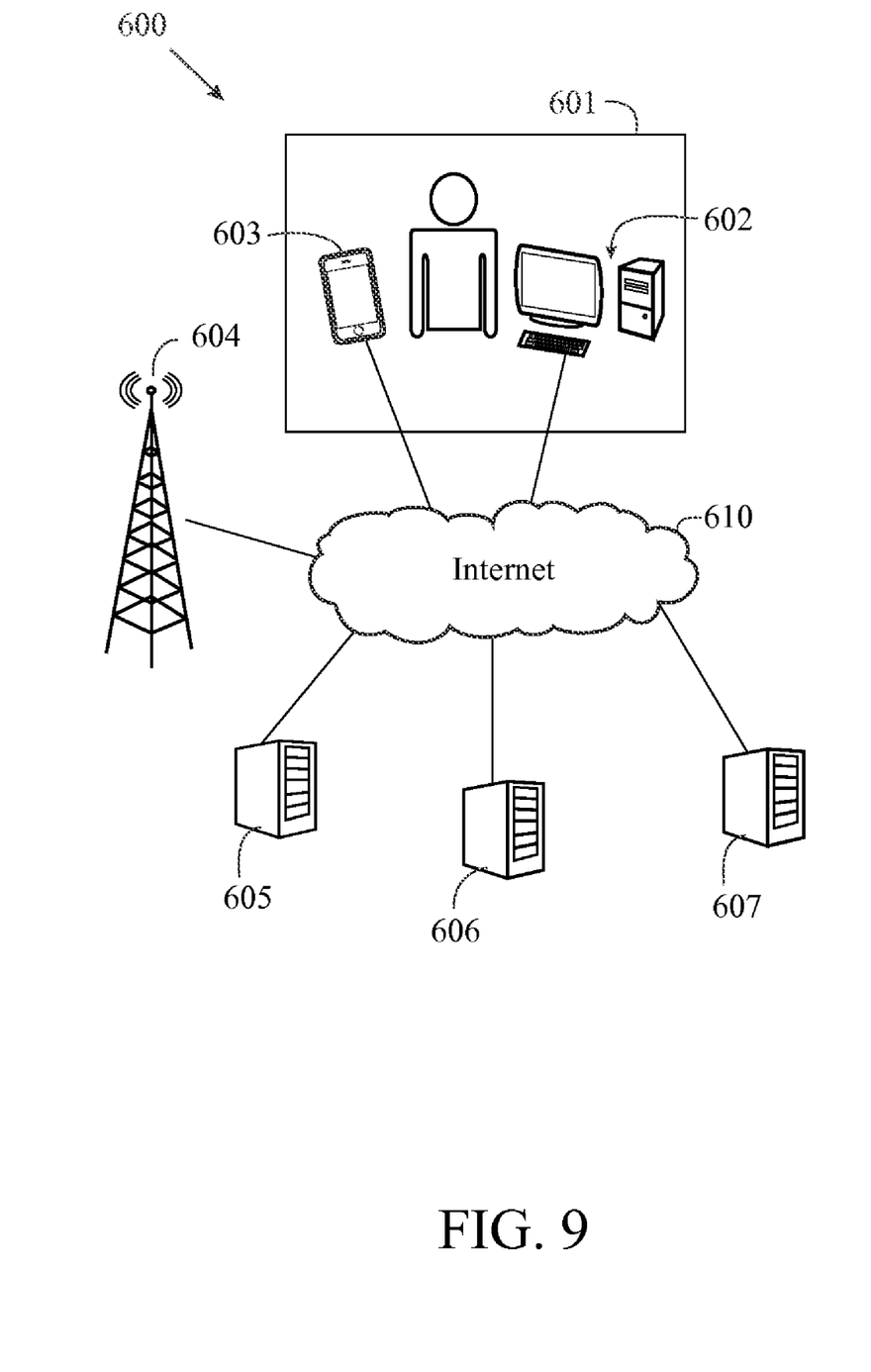
FIG. 9 is a block diagram of a system of the present invention.

FIG. 9 is a system 600 for an authentication process of the present invention. A user interface sub-system 601 comprises a mobile phone 603 and computer 602 or other graphical user interface computing devices such as tablets. The graphical user interface computing devices are used to access the Internet 610 using a carrier network 604 to access an authentication server 605, a third-party provider website located at a third-party-provider server 606 and a carrier server 607.

The main feature of the authentication process preferably involves submitting a facial image to the authentication server. The smart phone application is designed to force the user to take a photo from his camera, leveraging the phone API, and preventing the photo from coming from a photo album or other source in order to prevent fraud, and to ensure that the user is currently in the location of the mobile phone.

The photo is received by the authentication server and the face is detected. If no face is detected or more than one face is detected, an error response is sent. If the face has already been submitted to the service, meaning the photo is an old photo previously used, an error response is sent. If the image is submitted a second time with rotation, translation, skew, or lighting changes, an error response is sent. In other words, the authentication server prevents replay attacks using an old photo.

Given that an image has not been submitted before, the database of valid users is searched. For any matches that meet the minimum confidence value, the PIN of that user is checked against the submitted PIN by the user. If the PIN matches, a verification message is sent to the mobile phone, otherwise an error message is sent to the mobile phone. All verifications are logged to the database; partners can then query a user identification and determine the last time the user was authenticated, and the geolocation position of the user at that time.

Feature phones do not necessarily have the hardware to capture images, geolocation, or have an accelerometer, thus the authentication process for features phones is different.

Only phones that cannot be hacked, or tampered with will be preferably supported by this secondary authentication mechanism. In order to find out what type of phone an end-user has, the authentication server preferably requests the userAgent of the phone through the carrier network, so it cannot be spoofed.

The userAgent returned by the carrier is checked against a database of supported mobile phones. If the phone is not supported, and error response is sent. If the phone is supported, the verification PIN is sent to the mobile phone.

Depending on the userAgent, either an MMS message with the PIN, or a txt message with a PIN is sent to the mobile phone over the network. Some feature phones can be tethered to a personal computer ("PC") to send and receive txt messages. For such feature phones, the PIN is sent as an image in an MMS message to prevent the PIN from being accessed by a PC. Again, this is done to prevent fraud, especially if a gambler is trying to gamble outside of a gambling jurisdiction.

The user then sends the PIN back to the partner's mobile web site, or online web site.

The present invention provides a more universal method for a gambler to place a bet using a mobile phone. For example, a gambler named Jessica wants to place a bet on a soccer match with her favorite casino, but she doesn't want to drive all of the way over to the casino. Jessica, who resides in Clark County, Nevada, and is now located in Las Vegas, Nev., telephones her casino's mobile phone betting line from her smartphone. Jessica shakes her phone to activate an accelerometer of the smartphone, which transmits a signal to the casino. Jessica then activates her smartphone's camera and Jessica photographs herself during the telephone call. Jessica transmits the image along with her pin to the casino. Jessica's smartphone is also located using either triangulation, an on-device GPS or the closest cell phone tower. Once the verification process is completed, Jessica places her bet.

Another aspect of an authentication process of the present invention is the use of non-repeating PIN. The authentication process eliminates the need for a user to remember a PIN since the PIN is sent from the authentication server to the mobile phone as a text message for each authentication process. The PIN preferably originates from a third-party provider website on which the user wants to conduct a transaction.

In another aspect of an authentication process of the present invention, the user accesses a third-party provider website using a browser on the user's mobile phone. The third-party provider website then sends webpage to user's mobile phone. Such communication is preferably performed using a standard HTTPS request format. The user then accesses the webpage to perform a transaction that requires authentication. In accessing as logon for example of the webpage, the user sends a request to the authentication server, although the user most likely is aware of the request being sent to the authentication server since the webpage appears to be the third party provider webpage.

The user then accesses a mobile phone authentication software application which has been downloaded to the user's mobile phone. If the user has not already downloaded the software application, the user is instructed to download the software application. The user then requests a PIN, which is preferably sent as a SMS text message (or MMS message) to the mobile phone. This prevents fraud since only the person with the phone will receive the PIN. The user also must photograph himself or herself and send that real-time facial image to the authentication server for verification. A facial image of the user is already in a database and a primary feature vector (or a plurality of feature vectors) of the real-time facial image transmitted for the current transaction is compared a primary feature vector for the photo in the database in order to confirm that the mobile phone is being used by the authorized user. Further, the authentication server preferably requires that the user shake the mobile phone to trigger an accelerometer of the mobile phone in order to confirm that the mobile phone is being used. The accelerometer confirmation signal is also preferably sent to the authentication server. The authentication server then transmits the verification data to the third-party provider server to essentially authorize the transaction since the user and the user's location has been authenticated.

Table One provides an example of the verification data that is sent to a third party provider server by the authentication server.

TABLE ONE

| DATA | VALUE |
| --- | --- |
| Mobile Phone Number | 858555555 |
| Longitude | 117.254643 |
| Last Login | 2011 Jan. 1 1:22:22 |
| Identification Number | 59 |
| Image URL | http://gen/com/pv/image |
| Latitude | 32.995125 |

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes modification and substitutions of equivalents may be made therein without departing from the spirit and scope of this invention which is intended to be unlimited by the foregoing except as may appear in the following appended claim. Therefore, the embodiments of the invention in which an exclusive property or privilege is claimed are defined in the following appended claims.

We claim as our invention the following:

1. A method for authentication using a mobile phone, the method comprising:
   receiving a communication from a mobile phone, the mobile phone having a camera;
   receiving a confirmation that an accelerometer of the mobile phone has been activated during the communication;
   receiving an image of an account holder from the camera of the mobile phone;
   analyzing the image of the account holder using a facial recognition program;
   confirming that the image of the account holder is a new image of the account holder;
   verifying that the mobile phone is geographically located in a specific jurisdiction;
   receiving an account action from the account holder; and
   transacting the account action for the account holder.

2. The method according to claim 1 wherein the account holder is a gambler, the specific jurisdiction is a gambling jurisdiction and the account action is a bet.

3. The method according to claim 2 further comprising confirming that the gambler has established an account with a gambling site and the name, age and mobile phone number for the gambler has been verified.

* * * * *